United States Patent
Balbach et al.

[11] Patent Number: 5,951,792
[45] Date of Patent: Sep. 14, 1999

[54] METHOD FOR WELDING AGE-HARDENABLE NICKEL-BASE ALLOYS

[75] Inventors: Werner Balbach, Würenlingen; Sorin Keller, Oberrohrdorf, both of Switzerland; Reiner Redecker, Hohentengen, Germany

[73] Assignee: Asea Brown Boveri AG, Baden, Switzerland

[21] Appl. No.: 09/153,017

[22] Filed: Sep. 15, 1998

[30] Foreign Application Priority Data

Sep. 22, 1997 [DE] Germany .................. 197 41 637

[51] Int. Cl.⁶ .................................................. B23K 20/02
[52] U.S. Cl. ................ 148/527; 148/528; 228/199; 228/262.3
[58] Field of Search ............. 148/524, 527, 148/528; 228/175, 199, 262.3

[56] References Cited

U.S. PATENT DOCUMENTS

| | | | |
|---|---|---|---|
| 4,581,300 | 4/1986 | Hoppin et al. | 228/175 |
| 4,869,645 | 9/1989 | Verpoort | 148/522 |

FOREIGN PATENT DOCUMENTS

| | | |
|---|---|---|
| 3015638 | 11/1980 | Germany . |
| 3607699C2 | 10/1989 | Germany . |
| 1-241388 | 9/1989 | Japan . |
| 2-215968 | 8/1990 | Japan . |

OTHER PUBLICATIONS

"Untersuchungen zum Diffusionsschweissen einer Ni3Al–Legierung", Chuang, et al., Schweissen und Schneiden 44 (1992), pp. 559–564.

Handbuch der Schweisstechnik, Band I: Werkstoffe, J. Ruge, 1992, pp. 253–255.

*Primary Examiner*—George Wyszomierski
*Attorney, Agent, or Firm*—Burns, Doane, Swecker & Mathis, L.L.P.

[57] ABSTRACT

In a method for welding age-hardenable nickel-base alloys, a workpiece (5) made from an age-hardenable nickel-base alloy (1, 2) is welded with filler material of the same composition as the base material. The weld metal (3) which is formed in so doing is covered by a sealed covering layer (4) comprising a ductile material and the workpiece (5) is subjected to hot isostatic pressing (HIP).

8 Claims, 1 Drawing Sheet

METHOD FOR WELDING AGE-HARDENABLE NICKEL-BASE ALLOYS

BACKGROUND OF THE INVENTION

1. Field of the Invention

The invention is based on a method for welding age-hardenable nickel-base alloys in such as workpieces made of age-hardenable nickel-base alloys using a filler material of the same composition.

2. Discussion of Background

Nickel-base alloys contain, in addition to Cr, primarily also Co, Mo and W for increasing the strength of the mixed crystal, and usually Ti and Al for forming creep-inhibiting precipitations in the form of inter-metallic phases ($\gamma'$-phase), which make these alloys age-hardenable. Moreover, small quantities of rare-earth metals, such as cerium, hafnium, zirconium and yttrium, are often added for their corrosion-inhibiting effect.

Age-hardenable nickel-base alloys are regarded as difficult to weld and tend to form cracks in the heat-affected zone, but particularly in the weld metal. For this reason, such alloys are only welded at uncritical locations using "amenable" Ni-base alloys, such as for example IN625, which do not have the high strength of the base material. Consequently, workpieces which have been welded in this way have at most the strength of the "amenable" Ni-base alloy.

Thus precision castings made from age-hardenable Ni-base alloys, such as for example IN738LC, have to be scrapped in the event of casting defects, such as inclusions, nests of pores, etc., since these defects cannot be eliminated by welding, because according to the above method welded precision castings would have unsatisfactory materials properties.

DE-A 30 15 638 has disclosed a method for improving the physical properties of heat-damaged zones of welds carried out on nickel-base alloys. To do this, the welded body is heated and an isostatic pressure is applied, with the result that the material is deformed plastically, the porosity is reduced and the heat-damaged zone is homogenized. The body is heated in an inert or oxygen-free atmosphere. The welding is carried out with filler and base materials of the same composition. The drawback of this method consists in the fact that only those of the cracks and pores which are not in communication with the surface are closed up by the above-described treatment. This is generally unsatisfactory for the component to function.

SUMMARY OF THE INVENTION

Accordingly, one object of the invention is to provide a novel method for welding age-hardenable nickel-base alloys of the type mentioned at the outset in which the welding generates a weld metal which has at least approximately the same properties as the base material.

According to the invention, this is achieved by means of welding a workpiece made of an age-hardenable nickel-base alloy base material with filler material of the same composition as the base material, and subjecting the workpiece to hot isostatic pressing, wherein weld metal formed during welding is covered by a sealed covering layer of a ductile material before the hot isostatic pressing is carried out.

The core of the invention therefore lies in welding a workpiece made from an age-hardenable nickel-base alloy using filler material of the same composition as the base, in covering the weld metal which is formed by a sealed covering layer comprising a ductile material and by subjecting the workpiece to hot isostatic pressing.

The advantages of the invention are to be seen, inter alia, in the fact that the microstructure and mechanical properties of the weld metal correspond to the base metal of the workpiece. Cracks and pores in the weld metal are closed up by the hot isostatic pressing, with the result that the properties of the base material can be reached.

The advantage of the sealed, ductile covering layer, which is welded on, for example, as a cover pass or is an application of solder or a thermally sprayed layer, consists in the fact that it can be applied essentially without cracks. Stresses are reduced and do not lead to crack formation. The cracks in the weld metal lying beneath it, which is of the same composition as the base material and is of high strength and low ductility, are therefore closed off. Then, since they are no longer in communication with the surface and therefore are no longer accessible to the process gas, these cracks can then be healed out during the hot isostatic pressing.

This method allows precision castings made from age-hardenable nickel-base alloys to be repaired or joined by welding. As a result, the rejection rate during the production of precision castings made from age-hardenable nickel-base alloys is reduced drastically.

Further advantageous configurations of the invention emerge from the subclaims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only those elements which are essential for an understanding of the invention are shown.

DESCRIPTION OF THE PREFERRED EMBODIMENT

Figure 1:
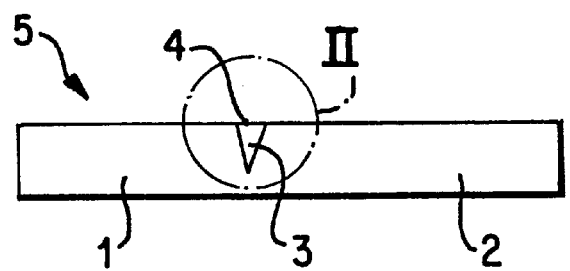
FIG. 1 shows a partial longitudinal section through a welded specimen.
Figure 2:
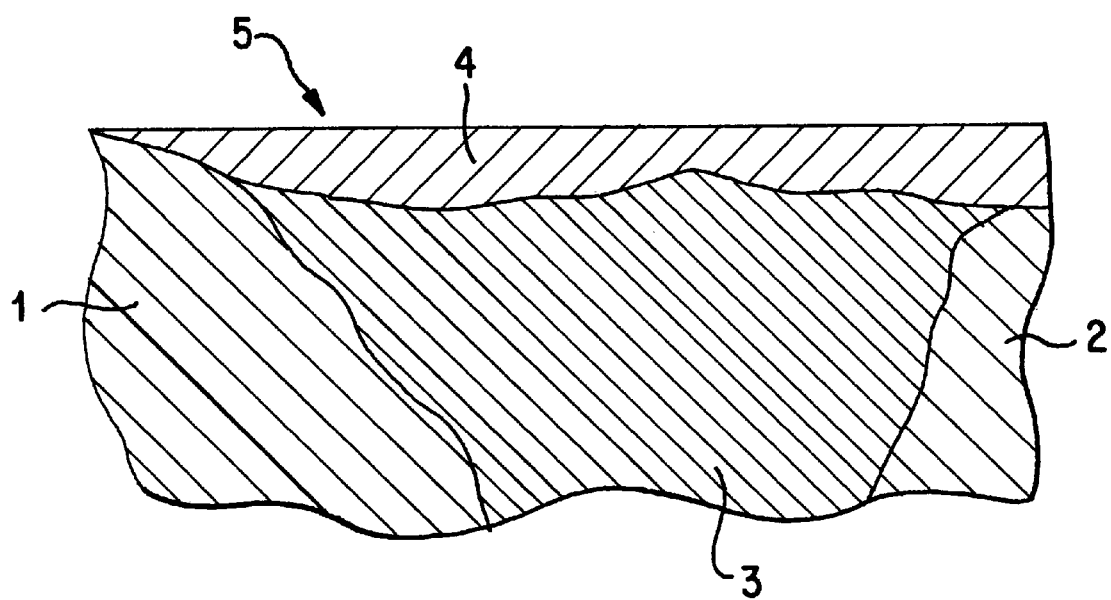
FIG. 2 shows the detail II from FIG. 1.

Referring now to the drawings, wherein like reference numerals designate identical or corresponding parts throughout the several views, in accordance with FIGS. 1 and 2 two parts 1 and 2 made from the same base material, in this case IN738LC, are welded together by means of tungsten inert-gas welding (TIG) and a workpiece 5 is produced. All age-hardenable casting and wrought alloys which are based on nickel or nickel-iron and can be used for blades may be used as the base material. During this process, an arc which is surrounded by a protective stream of inert gas is generated between a tungsten electrode and the workpiece 1, 2. The filler material which is added during welding may be supplied by hand or by machine from rolls. In this case, the filler material which is used to produce the weld metal 3 consists of material of the same composition as the base material, for which reason the composition of the weld metal 3 corresponds to the base material. The filler material is applied in small beads and coarse defects are ground out. When the operation of applying the weld metal 3 has finished, a cover pass 4 which is laid around the weld metal 3 and comprises a ductile material, in this case a ductile Ni-base alloy, for example S-NiCr20Nb, IN617, IN600, Haynes 230, IN625, is welded thereto. It is, important here that the cover pass 4 closes off the weld metal 3 so that it is sealed with respect to the outside.

As an alternative to the welded cover pass 4, it is also possible to apply another form of sealed covering layer 4. A sealed application of solder by means of paste or brazing foil, which is sintered in, e.g. Amdry 103, is, for example, suitable. This sealed application may also be provided with a coating applied, for example, by means of plasma spraying or HVOF (High Velocity Oxygen Fuel).

The workpiece 5 is then introduced into a furnace and is subjected to hot isostatic pressing (HIP). The parameters of the HIP process are dependent on the material and have to be selected in such a way that cracks and closed pores in the weld area are completely eliminated. The temperature selected lies below the melting point of the alloy used. In the present example, the workpiece was subjected to hot isostatic pressing at approximately. 100 MPa (1000 bar) and 1180° C. The hot isostatic pressing may also take place, by way of example, at 100 to 170 MPa and 1080 to 1260° C. for 3 to 4 hours.

Then, the workpiece was subjected to a customary heat treatment, as is used, for example, for precision castings, in order to achieve the desired materials properties of the workpiece 5.

The heat treatment comprised a solution-annealing treatment at 1120° C. for 2 to 2.5 hours, in order to largely dissolve the γ' phase, and then the workpiece was cooled at 20 to 70° C. per minute and age-hardened at 850° C. for 16 to 20 hours. These parameters of the heat treatment process are material-dependent, so that these values have to be adapted accordingly for other materials.

Following this heat treatment, the workpiece was subjected to mechanical and microscopic examination. To do this, tensile test specimens were taken across the weld seam and compared with tensile test specimens which consist entirely of the base material. It was found that the tensile test, specimens produced across the weld seam had the same strength as the tensile test specimens which consisted entirely of base material. The microstructural examinations also showed that the weld metal has a uniform microstructure which is comparable to that of the base material.

Depending on the use of the workpiece treated using the above method and depending on the materials properties of the ductile covering layer, for example with regard to scaling resistance, the covering layer can be left in place or else has to be ground off.

This method may also be used for repairing or joining precision castings, for example in the case of turbine blades, in which case the covering layer is usually removed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for welding age-hardenable nickel-base alloys, comprising welding a workpiece made of an age-hardenable nickel-base alloy base material with filler material of the same composition as the base material, and subjecting the workpiece to hot isostatic pressing, wherein weld metal formed during welding is covered by a sealed covering layer of a ductile material before the hot isostatic pressing is carried out.

2. The method as claimed in claim 1, wherein a ductile nickel-base alloy is applied as the covering layer.

3. The method as claimed in claim 1, wherein solder is applied as the covering layer.

4. The method as claimed in claim 1, wherein a thermal sprayed layer is used as the covering layer.

5. The method as claimed in claim 1, wherein the workpiece is subjected to hot isostatic pressing at below the melting point and at 100 to 170 MPa.

6. The method as claimed in claim 1, further comprising heat treating the workpiece, the heat treatment comprising solution-annealing and age-hardening the workpiece after the hot isostatic pressing.

7. The method as claimed in claim 1, further comprising removing the ductile covering layer after the hot isostatic pressing.

8. The method as claimed in claim 1, wherein the workpiece comprises a precision casting made from an age-hardenable nickel-base alloy.

* * * * *